United States Patent [19]

Sender

[11] 3,715,758
[45] Feb. 6, 1973

[54] METHODS AND APPARATUS FOR PRECISE POSITIONING OF LOCATIONS

[75] Inventor: Friedhelm K. Sender, Hannover-Wulfel, Germany

[73] Assignee: Prakla Gesellschaft fur Praktische Lagerstattenforschung GmbH, Hannover, Germany

[22] Filed: July 7, 1970

[21] Appl. No.: 52,893

[30] Foreign Application Priority Data

July 10, 1969 Germany.....................P 19 34 960.1

[52] U.S. Cl. .........343/112 R, 343/105, 343/105 LS, 343/112 D
[51] Int. Cl................................................G01s 5/14
[58] Field of Search .....343/112, 112 D, 105 LS, 105

[56] References Cited

UNITED STATES PATENTS 2,513,319  7/1950  Hawkins...........................343/105 X
3,161,880  12/1964 Swanson et al. ..................343/105 R
3,150,372  9/1964  Groth, Jr. .........................343/112 R Primary Examiner—Samuel Feinberg
Assistant Examiner—Richard E. Berger
Attorney—Arnold, White & Durkee, Tom Arnold, Robert A. White, Bill Durkee and Frank S. Vaden, III

[57] ABSTRACT

A radio location system employing at least two fixedly installed transmitters operating on substantially continuous carrier frequencies and a fixedly installed reference transceiver suitably located to receive the carrier frequencies from each of the transmitters. A station receiver is located at the location that is to be precisely positioned which synthesizes the frequencies of the two transmitters and determines position by developing traveltime information to the receiver, these synthesized carrier frequencies being absolutely determined with respect to an atomic clock. A similar atomic clock in the reference transceiver similarly determines synthesized frequencies and their error with respect to the transmitted frequencies. These error corrections are converted to digital form and transmitted to the station receiver for correcting the developed traveltime information and hence developing precision positioning information.

20 Claims, 6 Drawing Figures

Friedhelm K. Sender
INVENTOR

BY
Arnold, White & Durkee
ATTORNEYS

Friedhelm K. Sender
INVENTOR

BY
Arnold, White & Durkee
ATTORNEYS

METHODS AND APPARATUS FOR PRECISE POSITIONING OF LOCATIONS

FIELD OF THE INVENTION

The present invention relates to apparatus and methods for radio positioning and navigation, and more particularly, to apparatus and methods for precision positioning of a station at sea.

DESCRIPTION OF THE PRIOR ART

Precision positioning of offshore platforms and other sea stations within an accuracy of ± 20 meters or better is still very expensive and difficult, although the need has prompted much research. The reason for the failure to develop an accurate, but inexpensive, system is probably because for distances beyond the visual range only electromagnetic waves with suitable propagation characteristics are available as means for employment in such a positioning system. It has been felt that to obtain the desired precision operation for transmitting and receiving such waves, apparatus requirements would be complex and hence expensive.

Some methods having the desired accuracy which are known, and which may be classified as "quasi-optical" systems, use high-flying aircraft or orbiting objects as relay stations. The identifying names for two such exemplary systems are "HIRAN" and "AERODIST." Both of these systems use rather complex and costly equipment both for the airborne relay stations and for the ground stations. The prohibitive costs, despite their high accuracies, have caused these systems to be of little practical use.

Further, systems which make use of electromagnetic waves following the curvature of the earth, require employment of carrier frequencies in rather overcrowded broadcast bands. It is exceedingly difficult to obtain new operating licenses for these carrier frequencies.

Attempts have been made to obtain increased accuracies from existing fixed installation navigation systems. These attempts have failed to produce relatively inexpensive equipment producing accuracies greater than approximately ± 1 nautical mile. For normal sea and air navigation, this accuracy is sufficient, but for precision location, it is not.

High expenditures of obtaining accuracies within the range of ± 20 meters are necessary to improve existing systems. Since most users can manage with the accuracies currently attainable, the research for obtaining higher accuracies must be borne by the few vitally concerned for greater accuracy. Hence, it is still more economic to install private navigational stations with short range propagation characteristics, but which are capable of high accuracy for precision location in limited areas, than to develop precision long range systems. The most costly item is the cost of installing and operating the transmitters. There is also still great difficulty in obtaining free carrier frequencies.

Operation with existing fixed installation systems, insofar as feasible, is desirable since these installations are already existing and operating. However, the methods of operation in accordance with the complete systems known today, mostly outfitted for normal sea and air navigation, only obtain accuracies of ± 1 nautical mile. Therefore, the manner of using these stations must be improved if the greater accuracies are to be realized.

It is a purpose of the present invention to present methods and apparatus by which, especially in sea areas, the location of offshore platforms or other similar stations can be determined with a minimum accuracy of ± 20 meters. However, the present methods and apparatus are not limited to such application, since the methods and apparatus may be used in navigating on land. Precision locating and/or navigating in accordance with the present invention is performed in a manner that overcomes the disadvantages recited above at minimum cost.

To obtain the hereinabove range of ± 20 meters, it has been thought that considerable costs must be incurred to improve the existing systems to achieve the desired accuracy. The basic idea of the present invention is to make wide use of the already existing systems in a new manner. Transmitters of existing systems are known to emit carrier frequencies with precision. When these carrier frequency signals are received, such carrier frequencies may be corrected by additional information so that the desired navigational accuracy is obtained. The development of this additional information allows the present invention to develop a system for precise navigation or location of a mobile receiver in a sea area within the range of several shore stations, the carrier frequencies of which may be controlled by crystal standards and which are being continuously transmitted.

It is a further feature of the present invention that at the mobile receiver station, and at a second fixed receiver station located within the receiving range of the shore stations, to use the carrier frequencies transmitted by the shore stations and to compare their frequencies and phase with frequencies derived from theoretically equal and identical atomic frequency standards. From a correction value developed at the fixed receiver station, error correction data is transmitted to the mobile receiver stations, which is then combined with the traveltime values arrived at in the mobile receiver station, for developing a precise marking of the mobile receiver.

It is a further feature of the present invention to employ, in a precise navigation system for locating a mobile receiver, a transceiver located at a fixed receiver station for developing correction data from fixed shore stations, the receiver portion of the transceiver and the mobile receiver each establishing carrier frequency operation controlled by atomic frequency standards.

Apparatus operating in accordance with the present invention typically includes a mobile receiver at the station to be precisely positioned. The carrier frequencies of such a receiver are controlled by crystal standards, the internal frequencies being continuously sustained. The mobile receiver operates in conjunction with a second receiver station serving as a reference station at a fixed installation within the zone of shore stations during the measuring procedure. Both the mobile receiver and this reference station receiver are equipped with identical atomic frequency standards, and with instruments for comparing the carrier frequencies received from the shore stations and their phase positions with theoretically identical ones. Further, correction values are determined at the fixed reference receiver station. A transmitter at this station forwards the correction values determined in the fixed reference receiver station to the mobile receiver station, the mobile receiver station having a comparison system for combining the traveltime values determined in the mobile receiver station with the correction values transmitted from the fixed receiver station, thereby establishing a signal marking the location.

Methods and apparatus operating in accordance with the present invention operate with at least two shore or fixed stations. If more shore stations are employed, however, redundant definition is obtained, which contributes to higher accuracy.

It is therefore yet another feature of the present invention that a reference station is installed at a suitable place on land. This reference station receives a carrier frequency signal from all of the employed transmitter stations and compares their carrier frequencies and phases with their normal frequencies derived from the atomic frequency standard. The deviation of these crystal controlled carrier frequencies with respect to the values attainable by the atomic frequency standard control is thereby determined. The stability of the crystal (quartz) oscillators in the transmitters over relatively short periods of time, e.g., over several minutes, is almost as exact as that of the atomic frequency standard. A change of frequency and phase difference may therefore be only at a very slow rate. To transmit this information to the mobile receiver station, high information flow is not required. A one-way information channel may be established from the reference station to the recording vehicle (mobile receiver station) using low band width transmission (their being no need for wide band width). The traveltime of this information signal is also only a secondary concern, since the change of information is so gradual. Moreover, even a skyway connection will serve for this purpose. Normally, the band width will approximately correspond to the band width order of a channel used in radiotelethony transmission.

Any transmitter station whose carrier frequency is stabilized such as with a crystal control oscillator, and whose carrier frequency is continuously present, is accessible for a transmitter operating in accordance with this invention. Therefore, all A2 and A3 modulated transmitters are acceptable. An interruption of the carrier frequency for several milliseconds, e.g., 10 to 100 milliseconds as the case may be with 100 percent modulation peaks in A3 transmitters, is of no significance. However, A1 modulated radio beacons are not suitable.

For a theoretical consideration of the function of the apparatus suitable for the purpose of the present invention, the following expressions are helpful:

$T_a$ = absolute reference time to which the atomic frequency standards are set.

$f_a = 1/T_a$ = carrier frequency referred to the absolute reference time.

$T_x$ = an unknown reference time for the carrier frequency of one of the engaged transmitters.

$f_{Tr} = 1/T_x$ = carrier frequency of an engaged transmitter referred to the unknown carrier frequency.

$\Delta f = f_{Tr} - f_a$ $f_n = f_a - \Delta f$ = the standard transmitter frequency which should be $f_{Tr}$.

Practically, it is not possible to synthesize frequency in infinitely small steps. Hence, there remains an extremely low additional frequency difference $xq$, $q$ being defined as the quantizing factor, i.e., the lowest possible frequency step in the synthesizer. The standard transmitter frequency deviates from $f_{Tr}$ by the very low amount $xq$ ($x \leq 1$).

Since the time constant $T_q$ equals $1/xq$ is very high, the value of $T_q/I_a$ may readily be forwarded in periods $t$ that are small compared to $T_q$. The ratio $T_q/I_a$ represents the momentary phase difference values between $f_n$ and $f_{Tr}$ or the $\Delta$Ph (phase deviation). This phase difference may easily be read on a goniometer, and is also inserted as the phase correction value in the mobile receiver.

The values $\Delta f$ and $\Delta$Ph are determined at a fixed receiver station, and transmitted via a telemetric chain to the mobile receiver to obtain a true frequency synthesis operation.

Absolute reference time $T_a$ is derived from the atomic frequency standards, the two standards possibly having a mutual difference $\Delta T_a$, the time deviation $dt_a$ of which is very low. Practically $dt_a$ may, for example, be 18 ns/h which correspond to a 5 m/h traveltime change.

The traveltime of the electromagnetic waves from the transmitter to the fixed receiver station is constant, so that the standard carrier frequency $f_n$ has a constant time deviation dependent upon the respective traveltimes, i.e., phase difference, with respect to $f_{Tr}$.

If the frequency standards of both stations coincide, that is, $\Delta t_a$ equals 0, $f_n$ in the mobile receiver station has the same stable phase difference to $f_{Tr}$ as in the fixed receiver stations. This value may be derived by computing from the geographical geometry or empirically at fixed points and be set as a constant value into the goniometer of the mobile receiver. Once this phase deviation is corrected for, a position dependent traveltime value may be evaluated. This is the phase difference for the traveltime of the electromagnetic wave from the transmitter to the mobile receiver station with respect to the corrected mobile frequency. This value appears, after $f_n$ has been correspondingly phase corrected to compare with $f_{Tr}$, as the phase difference in the mobile goniometer. A multiple of this phase difference may be developed in a phase counter and corresponds to the distance displayed in terms of the number of whole wave lengths of $f_{Tr}$ from the mobile receiver station to the transmitter.

If the reference time $T_a$ of the two stations differ by $\Delta t_a$, the phase positions of the standard transmitting frequencies $f_n$ obtained at the mobile station also will differ by phase angles which correspond to $\Delta t_a$. If several transmitters are used, the $\Delta t_a$ is equal for all carrier frequencies $f_{Tr}$. If navigation is made only in lines of equal traveltime difference (as is usually the case with hyprobolic navigation), $\Delta t_a$ is cancelled since it is a common constant for all stations. It is, however, necessary that the phase angle measurements of the individual channels be transferred into traveltime before forming the difference. The phase measurement $\phi$ is coupled with traveltime $t$ via the inverse of the carrier frequency.

$$\phi \cdot 1/f = t$$

This formula shows that the traveltime measured at the receiver station still depends on the error of the atomic frequency standards. This error is, however, essentially smaller than the error inherent to the carrier frequencies of the shore stations which are employed for the measurement. Simultaneous operation with respect to several coast or shore stations using the exactly derived frequency of the mobile station will result in an extremely accurate positioning.

DESCRIPTION OF THE DRAWINGS

So that the manner in which the above-cited features, advantages, and objects of the invention, as well as others which will become apparent, are attained and can be understood in detail, more particular description of the invention briefly summarized above may be had by reference to the embodiments thereof which are illustrated in the appended drawings, which drawings form a part of this specification. It is noted, however, that the appended drawings illustrate only typical embodiments of the invention and are therefore not to be considered limiting of its scope, for the invention may admit to other equally effective embodiments.

In the drawings.

DESCRIPTION OF PREFERRED EMBODIMENTS

Figure 1:
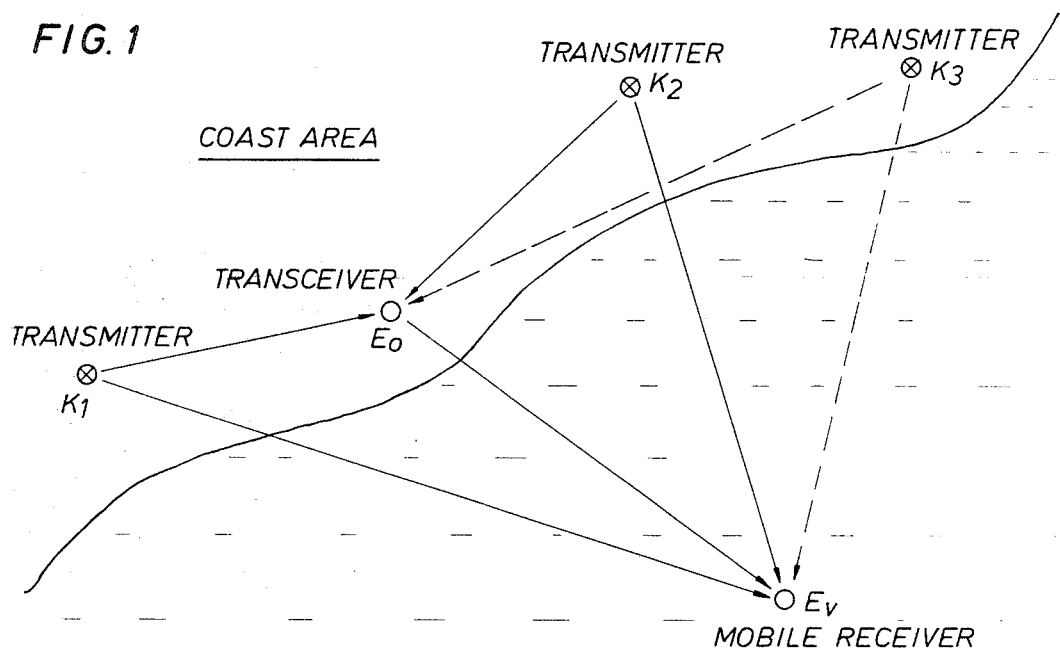
FIG. 1 is a plan view of a typical plot of an installation suitable for the purpose of the present invention.

Referring now to FIG. 1, there may be seen a mobile receiver station, designated $E_v$. The receiver station $E_v$ may, for example, be installed aboard a ship which is in a sea area within the transmitting range of transmitter stations $K_1$, $K_2$, $K_3$, ... $K_n$. At least two stations are required for operation. For purpose of discussion, it may be considered that these stations continuously transmit their carrier frequencies. However, an interruption of a carrier frequency for several milliseconds (e.g., 10-100 milliseconds, as may be observed in an $A_3$ transmitter at 100 percent modulation peaks) is of no consequence. In the transmitting range of all stations $K_n$ used for the navigational measurements as hereinafter described, a receiver station $E_o$ is also fixedly installed at a shore station, at least for the duration of the measurement. Receiver station $E_o$ is equipped with a receiver and a transmitter (a transceiver).

Figure 2:
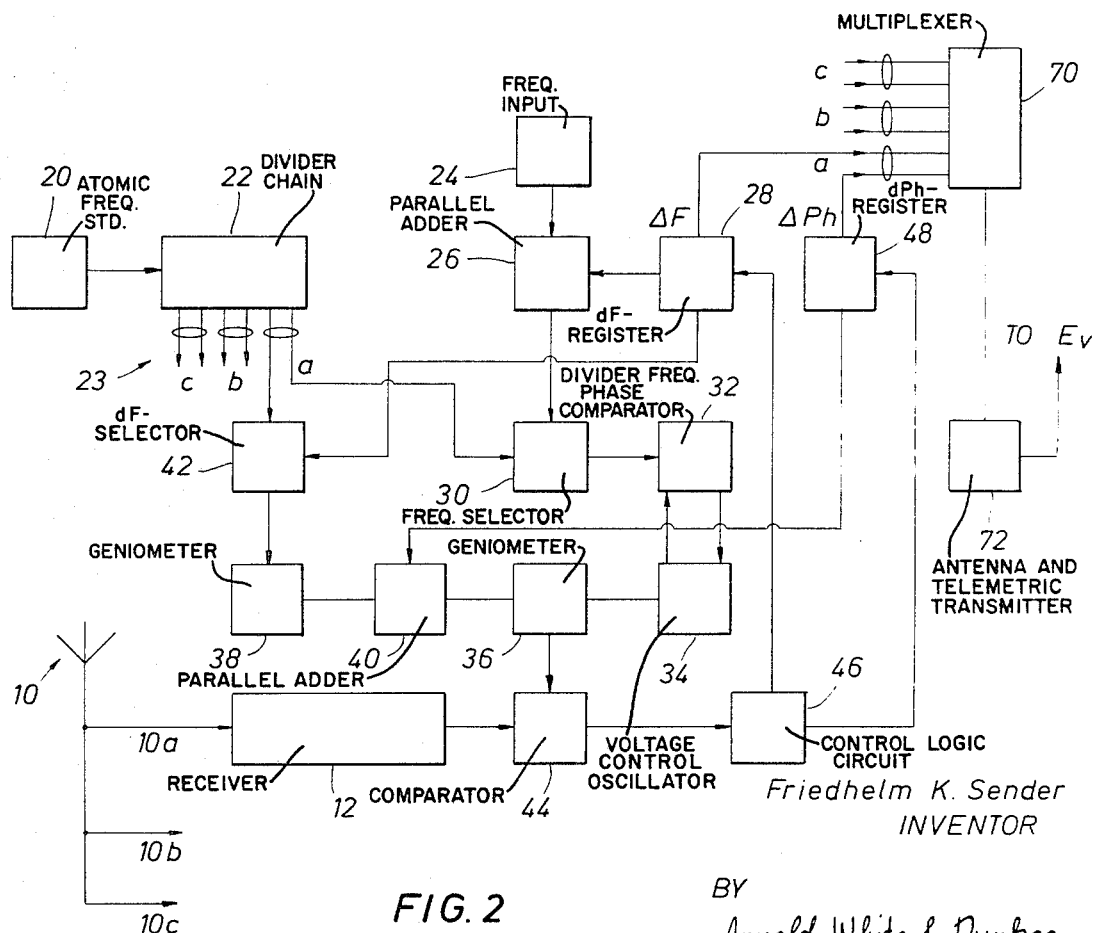
FIG. 2 is a functional block diagram representing a fixed receiver station used in the apparatus suitable for the purpose of the present invention.

FIG. 2 is a simplified functional block diagram of a fixedly installed receiver station $E_o$. The receiver station $E_o$ is equipped with an atomic frequency standard 20 yielding a standard frequency. Atomic frequency standard 20 includes a special synthesizer which produces in a representative example system a frequency of 8,388,608 MHz, thereby enabling operation using 1-Hz binary or octal steps for the following dynamic divider chain to permit such chain to operate directly in conjunction with a compatible input device. A divider chain 22 preferably used in the apparatus and suitable for the purposes of the present invention comprises a 31-step binary divider. This divider chain 22 has two outputs which, depending on the number of shore stations $K_n$ working with the apparatus, are branched in a corresponding number of connections 23a, 23b, 23c ... 23n. Also, receiving antenna 10 has a connection for each shore transmitter with which the system operates, there being for each individual shore station the hereinafter described apparatus for a derivation of correction values.

By a frequency input device 24, the nominal carrier frequency of the transmitter being received, and in conjunction with which operation is being performed, is applied in digital format in 1-Hz step to parallel adder 26. The value stored in dF-register 28 is added or subtracted, as the case may be, to this preselected digital frequency value. Frequency selector 30 is connected to the output of parallel adder 26, thereby obtaining from said parallel adder the effective producible frequency value. Also connected to frequency selector 30 is the respective output of the divider chain 22. The output from frequency selector 30 is connected to a unit 32, which operates as a divider and which further has a frequency and phase- comparator, for synchronizing the frequency produced by voltage control oscillator (VCO) 34.

In receiver station $E_o$ there is further a goniometer 36 having an 8-bit resolution. This goniometer will be hereinafter described more in detail. Goniometer 36 receives two inputs, one from VCO 34 and one from parallel adder 40. Parallel adder 40, in turn, receives one of its inputs from control register 38. Parallel adder 40 functions to provide phase shift logic to goniometer 36 by adding or subtracting, as the case may be, phase shift values to the instantaneous value received from control register 38.

Control register 38, which may be considered as part of the goniometer, also receives control pulses of selectable frequency via a dF-selector 42 connected to the output of the divider chain 22. Control register 38 is a reversible, bi-directional counter that permits small positive or negative frequency shifting to be made. In the operation of a goniometer having acceptable resolution, shifts are made in an 8-bit counter. The frequency difference is therefore one Hz in the case of an input of ± 256 pulses per second equalling 360° per second.

Through operation of dF-selector 42, frequency may be selected in fine steps below one Hz, for example, in 1/512 Hz units. This is done by selector 42 in switching preselectable pulse trained frequencies from divider chain 22 to the input of control register 38.

The receiver 12 is connected to antenna 10 to receive an input 10a from the transmitter corresponding to the selected frequency of operation. The output of receiver 12 is connected to phase comparator 44, which is also connected to receive an input from goniometer 36.

Phase comparator 44 determines a dc voltage from the phase difference between the carrier waves arriving at antenna 10 and the phase-shifted synthesized frequency produced by oscillator 34 operating in conjunction with goniometer 36 connected to the oscillator. The dc voltage produced from phase comparator 44 is applied to a control logic circuit 46 which, in turn, influences the values established in dF-register 28 and dPh-register 48. When the dc voltage from control logic circuit 46 is reduced to zero then the phase error in the register is reduced to zero.

The dF-register 28 and dPh-register 48, respectively, are both reversible, bi-directional counters. The frequency difference of the nominal or the preselected frequency is stored in register 28. In a practical version of the present invention, the resolution of this register is 16 bits. The instantaneous phase difference between the received carrier frequency and the synthesized frequency is stored in dPh-register 48. In a practical version of the present invention, the resolution of this register is 8 bits, the same as that of the goniometer.

When an error voltage exists, the control logic produces pulses and directional information derived from the dc voltage from phase comparator 44 and applies these pulses to dPh-register 48 until the error becomes zero through operation of the remainder of the circuit. If the pulse train for phase correction exceeds a certain fixed threshold number corresponding to the lowest selectable frequency change in degrees per second (in the example, 360/512 or approximately 0.07° per second), pulses will be supplied to dF-register 28 in accordance with the indicated counting direction until the change of the phase position per time falls below this threshold number caused by a corresponding frequency correction through operation of the overall circuit.

Register 48 supplies the phase difference value via the parallel adder 40 to goniometer 36. Register 28 sets the coarse values (in the example, greater than 1 Hz in 1-Hz steps) via parallel adder 26 connected to frequency selector 30. The fine values, below 1 Hz, are applied to dF-selector 42, which connects a clock frequency derived from divider chain 22 to control register 38.

The values in registers 28 and 48 represent the instantaneous phase and frequency-deviation of the selected carrier wave of the respective shore stations $K_n$. It is these values that are forwarded via a telemetric transmitter 72 to the mobile receiver station $E_v$. Circuits 20 and 22, as well as the antenna and telemetric transmitter 72, are jointly used when several carriers are employed, whereas all other components are duplicated in accordance with the number of carrier frequencies that are controlled. A multiplexer 70 is connected to the telemetric transmitter 72. This multiplexer is connected to the outputs of all registers 28 and 48 is such a way that these outputs are scanned in a predetermined sequence to permit simultaneous, parallel operation.

Figure 3:
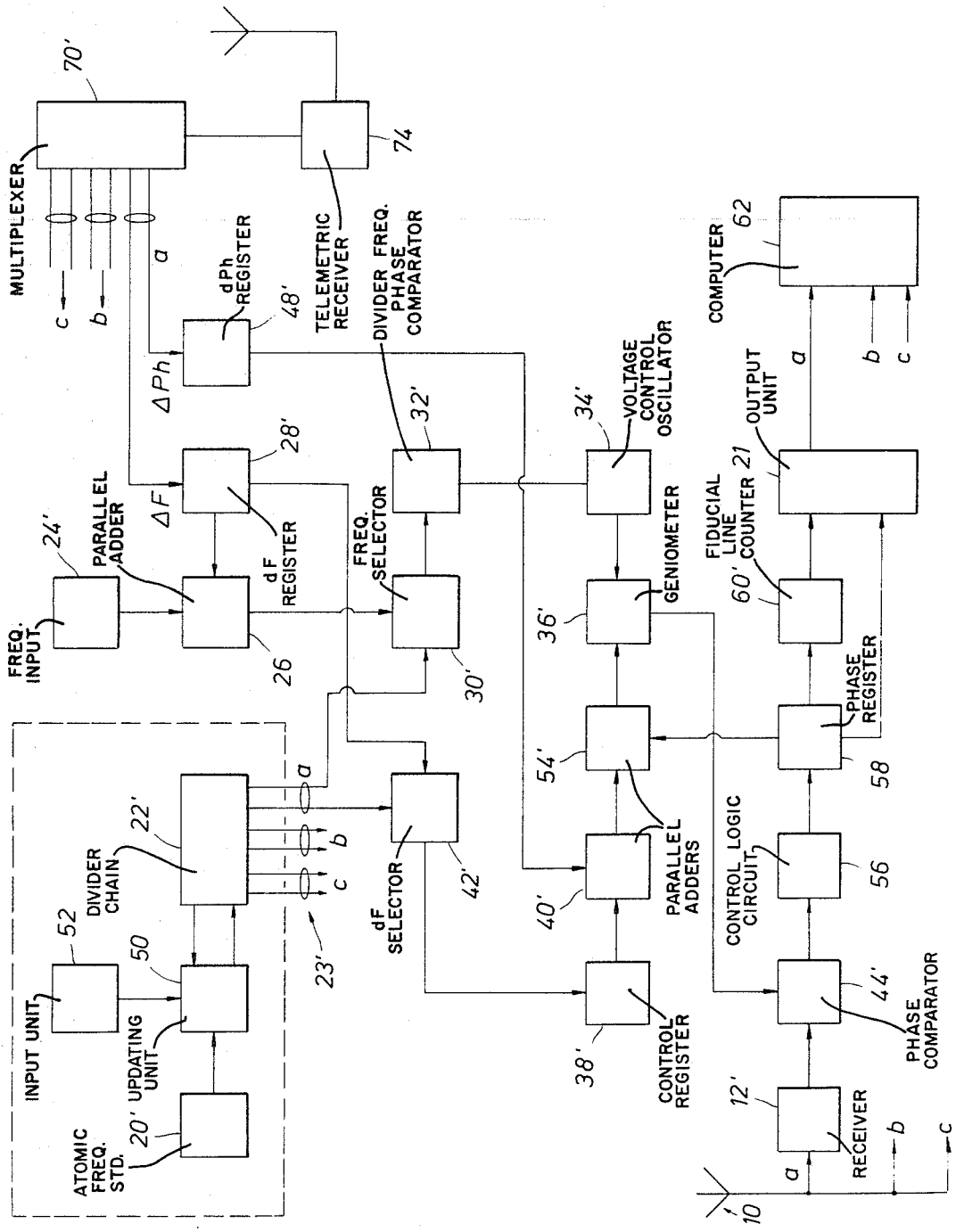
FIG. 3 is a functional block diagram representing a mobile receiver station used in the apparatus suitable for the purpose of the present invention.

A functional block diagram of a mobile receiver station in accordance with this invention is shown in FIG. 3. This station is employed with the fixed receiver station depicted in FIG. 2. The components of the mobile station which are essentially equivalent to those of the fixed station are characterized in the drawing with the same reference numerals, only with the addition of a prime mark. The parts which are framed in a dotted box in FIG. 3 are jointly used even if several carrier frequencies are employed, whereas all other components are present in the same number as the carrier frequencies with which the receiver operates.

In a modified version of the fixed station, an updating unit 50 is connected between the atomic frequency standard 20' and the dynamic divider chain 22', this updating unit being equipped with its own input device 52. It is possible to influence the dynamic divider chain with the units 50 and 52 so that this dynamic divider chain works absolutely synchronously with the divider chain 22 in the fixed receiver station. The input unit 52 can be set either manually or by a navigational computer (not illustrated).

If both divider chains 22, 22' operates synchronously, navigation or position finding may develop a direct distance measurement to the selected transmitters. Local coordinates are determined by the intersection point of two radii, representing the distances to the two shore stations $K_n$. This is the most advantageous kind of position finding or navigation measurement. It is, however, required that a carrier wave be received by at least one additional shore station in order to obtain by redundancy the necessary information for updating the divider chain to ensure absolute synchronism.

It is possible to navigate with at least three shore stations using hyperbolic coordinates. In this case, only the traveltime difference between the signal stations are required as information, so that an updating of the dynamic divider chain is not a requirement.

A further difference of the mobile receiver station compared with the fixed station operation is that the registers 28' and 48' are not set by a control logic developed within the receiver, but are set via the telemetric chain with the values obtained from the fixed receiver stations. For this purpose, a telemetric receiver 74 is used for receiving the signal from the fixed receiver station and supplying such information to multiplexer unit 70'. This multiplexer unit has n output pairs according to the number of shore stations $K_n$ with which it is operating. One output of an output pair is connected to register 28', and the other output of this same pair is connected to register 48'. The outputs of the divider chain 22' are correspondingly connected to the frequency selector 30' and the dF-selector 42' which are assigned for operation with respect to the same shore station.

There is an additional parallel adder 54 installed in the mobile receiver station between parallel adder 40' and goniometer 36' which is not found in the fixed station receiver. This parallel adder 54 receives an input from phase register 58, which operates as a bi-directional counter and is operated by a control logic circuit 56. Circuit 56 is, in turn, controlled by a phase comparator 44' connected to receiver 12'. Operation of the overall mobile receiver circuit reduces the phase difference in phase comparator 44' to zero.

It is assumed that registers 28' and 48', as well as frequency input device 24' at the mobile receiver station, produce the same input values as the corresponding components of the fixed station. In this way, a direct measurement of the distance to the respective shore stations may be obtained via a phase register 58 and a fiducial line counter 60 connected thereto, provided that the dynamic divider chains 22 and 22' are working synchronously according to the information gained by a navigation computer. If there is no updating information for the dynamic divider chains, only the traveltime difference between the mobile and the fixed receiver stations need to be determined as a measurement value, and provided further that the divider chain 22 and 22' in the fixed receiver station and in the mobile receiver station are the same for all carriers.

Output unit 21 is capable of displaying both the number of complete 360-degree phase departures developed in phase register 58 as presented and counted by line counter 60 and the partial cycles developed directly from phase register 58. A navigational computer may be connected to output unit 21 for translating the line count and phase information into conventional location or navigational language when supplied similar information from other transmitter channels via lines b and c to computer 62, as previously explained.

Figure 4:
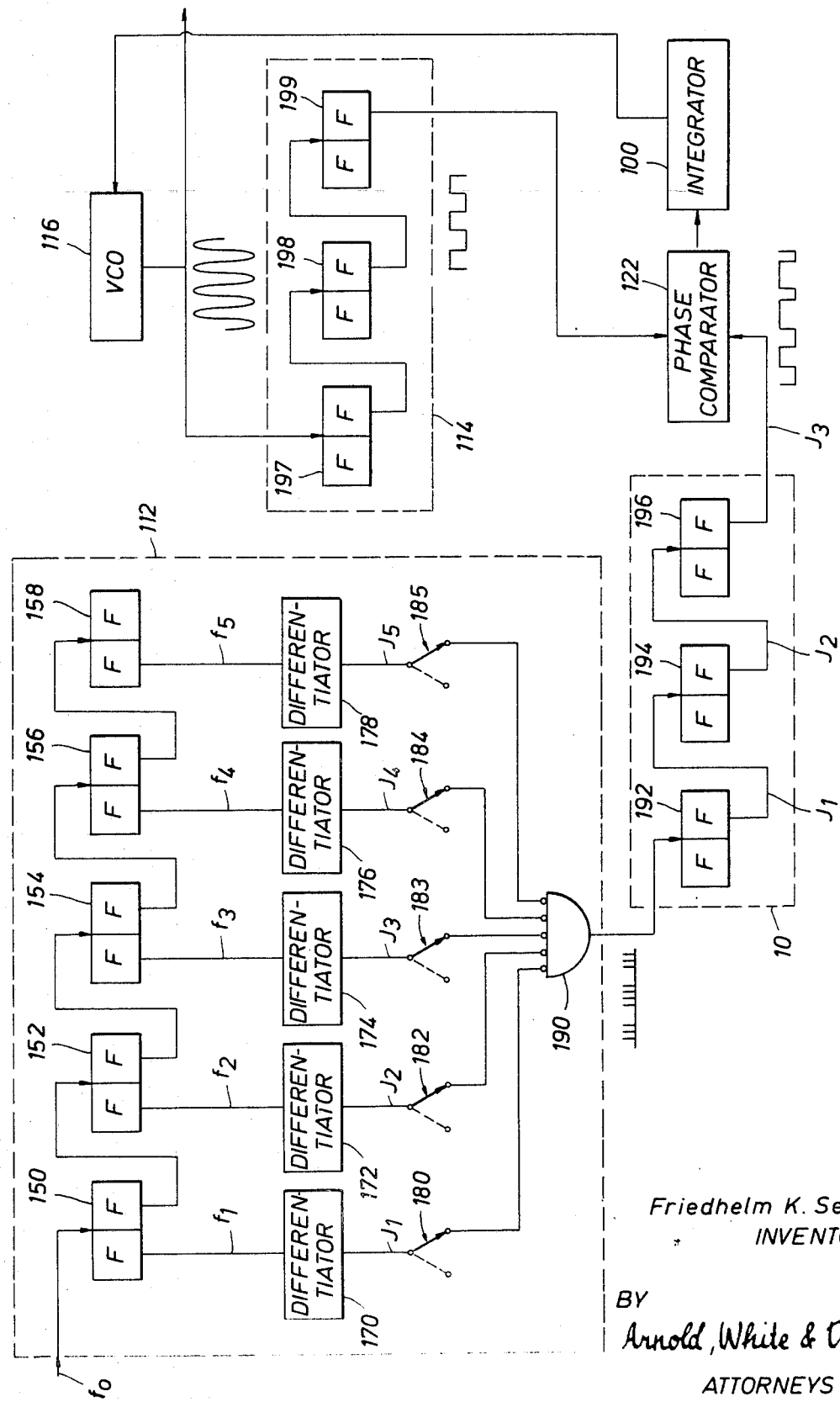
FIG. 4 is a functional block diagram representing a dynamic divider chain, which is a part of the apparatus depicted in FIGS. 2 and 3.
Figure 5:
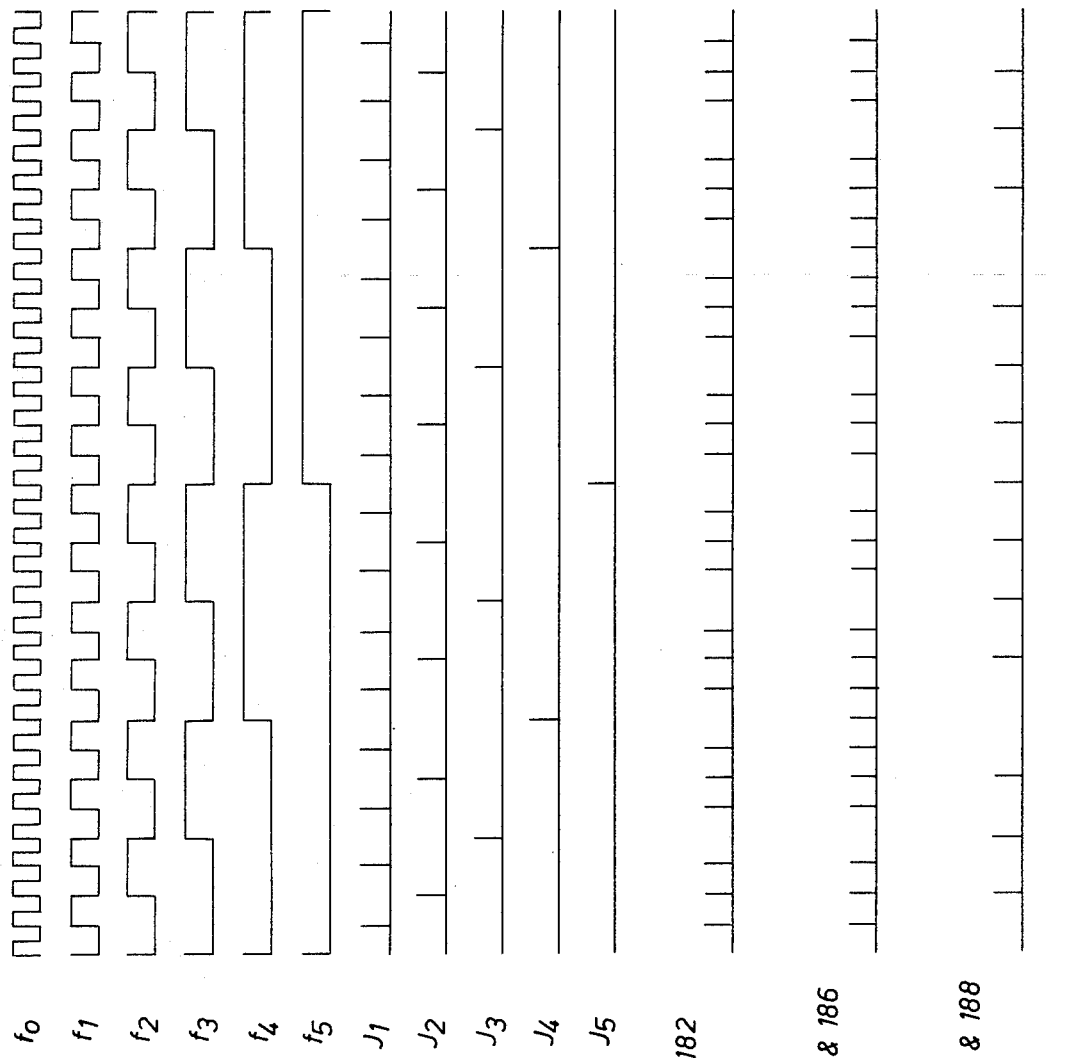
FIG. 5 is a pulse plan for illustrating the operation of an apparatus depicted in FIG. 4.

To illustrate the functions of components 20 and 22, or 20' and 22', reference is now made to FIGS. 4 and 5. As is well-known, atomic clocks or frequency standards normally deliver only fixed frequencies of 0.1, 1.0, and 5 MHz. Thus, the carrier and oscillator frequencies, which must be derived, must be compatible with one of these frequencies. There are several frequency synthesizing techniques presently employed in conventional rf equipment, but the equipment of the prior art is extremely bulky since they all require many resonance and filter circuits which cannot sufficiently be realized in integrated circuit technology. The synthesizers provided in the instant invention, however, is composed of digital and logic circuitry whereby the requirements of the instant invention are met with compact and simple apparatus which especially meet the requirements of a position-finding and navigation system.

An essential part of this system is a unit depicted in FIG. 4, which may be characterized as a dynamic multiplier. In this unit a standard frequency $f_o$, presented as a square wave, is divided by a flip-flop chain 150, 152, 154, 156 and 158.

The apparatus depicted in FIG. 5 shows only a 5-stage divider operation in order to simplify the illustration. It should be considered that the apparatus suitable for the present invention, and depicted in FIGS. 2 and 3 in a practical version hereof, has a 31-stage binary divider.

In particular, the frequency input presented as a square wave may be seen to be connected to the input side of the leading flip-flop circuit 150. Each of the flip-flops 150-158 may be coupled to OR gate 190 by means of respective ones of five differentiators 170-178 and five programming switches 180-188. The output signal generated by the OR gate 190 is applied to the input of the 8:1 frequency divider 110, which may be a chain of three flip-flops 192-196.

As will be shown the output from dynamic multiplier 112 is a train of unequally spaced pulses. In operation, each stage (flip-flop) of dynamic multiplier 112 toggles upon receipt of a negative input pulse. The inverted output pulses from each of five flip-flops 150-158 are differentiated as hereinabove stated, and are fed to OR gate 190 through respective ones of five switches 180-188. Thus, switch 180 controls the signal $f_o/2$ pulses provided by the first flip-flop 150, switch 182 controls the signal $f_o/4$ provided by the second flip-flop 152, switch 184 controls the signal $f_o/8$, and so forth.

It should be noted that none of the pulses in any one of these pulse trains applied to OR gate 190 ever coincides with a pulse in any of the other pulse trains. Thus, the dynamic multiplier 112 has the advantage of allowing two or more pulse trains to be gated together to obtain an output frequency which is simply the algebraic sum of the frequencies at the input of the flip-flops 150-158, and this would be impossible had coincidence occurred. When there is correct output coupling, there are never two pulses presented simultaneously at summing element 190, as may be seen from FIG. 4. This is true even if all switches 180-188 are closed. The pulse train at the output of the summing element consists of the sum of $\frac{1}{2}^n$ portions of $f_o$ delivered by the closed switches, $n$ corresponding to the respective ordinal number of the divider stage. If for instance switches 180 and 182 (switches 1 and 2) are closed, at the output there is a pulse train of $f_o/2 + f_o/4 = \frac{3}{4} f_o$. If the switches 180, 182 and 186 (switches 1, 2 and 4) are closed, the result is $13/16 f_o$. And in the case when switches 182, 184 and 188 (switches 2, 3 and 5) are closed, the result is $13/32 f_o$. By a suitable combination of the switch positions and with a sufficiently long divider chain, any arbitary fraction of $f_o$ may be selected as a pulse train. The multiplication factor is, however, always smaller than 1.

Referring now to FIG. 5, there may be seen a pulse schedule showing the occurrence and relationship of the various signals provided throughout dynamic multiplier 112 in response to its input signal $f_o$. In particular, $f_1-f_5$ are the pulse trains generated by five flip-flops 150-158, respectively; J1-J5 are the pulse trains generated by five differentiator circuits 170-178; and three examples of output signals provided by OR gate 190 as shown.

It will be noted that the pulse-to-pulse spacing is generally not uniform in the output signals from OR gate 190. Accordingly, it is more particularly the average frequency of the output of OR gate 190 which is sought to be established. If a greater resolution is desired, this may be accomplished by providing additional flip-flop stages in dynamic multiplier 112.

As further illustrated in FIG. 4, the output signal from OR gate 190 may be applied to the input side of a suitable 8:1 frequency divider 110, which may conveniently be a chain of three flip-flops circuits 192-196. The other 8:1 frequency divider 114, which received the output of voltage controlled oscillator 116, may similarly be a chain of three flip-flop circuits 197-199, and the outputs of these two frequency dividers 110 and 114 may be coupled to the input of a phase comparator 112.

In other words, the voltage control oscillator 116 is locked to the average pulse output of the dynamic multiplier 112, rather than to a pure frequency per second. Thus, the averaging phase modulation index of the output of dynamic multiplier 112 is reduced by means of frequency divider 110. Since the frequencies must be equal in order to be utilized by phase comparator 122, the output of the voltage control oscillator 116 is similarly divided.

The dc signal representing the error determined by phase comparator 122 will nevertheless contain an ac component of substantial size corresponding to the phase modulation of the pulse train generated by phase comparator 122. This is filtered out by means of integrator circuit 100 connected to phase comparator 122 before being returned to the voltage control oscillator 116 for controlling the frequency of its output.

In order to avoid such disadvantages of the servogoniometer as high weight, high power consumption, expensive maintenance costs, and relatively low life of the mechanism, as well as the additional expenditure for a digital angle-encoder, the preferred embodiment of the invention employs an electronic goniometer using a completely hybrid solid state, digital/analog technique for developing a digital output. The essential feature of this apparatus is that it corresponds to an electric-to-mechanical analogon or resolver having its output voltage switched as a phase shifter, and with input voltages equal to $U_{e1}$ and $U_{e2}$, wherein $U_{e1}$ is equal to A sin $\omega t$ and $U_{e2}$ is equal to a sin $\omega t + \pi/2$. Accordingly, $U_a$ is equal to $U_{e1}$ sin $\phi + U_{e2}$ cos $\phi$.

If a suitable digital-to-analog converter could be found which would produce voltages equal to sin $\phi$ of $U_{e1}$, and cos $\phi$ of $V_{e2}$, and which could provide the sum of these voltages, such a converter would constitute an electronic solution to the problem. The problem can be simplified, however, by utilizing triangular input voltages, instead of voltages which are sine shaped, since these voltages are used in the integration of a square or rectangular input voltage. Thus, use of e1 and e2 may be alternating triangular functions which are shifted by the factor $\pi/2$. Further it will be apparent that the function $U_a$ is an alternating function equal to $f(\phi)U_{e1} + U_{e2}$. Only in the case wherein $\phi = 0$, $\pi/2$, $\pi$, or $3\pi/2$, will the summed output voltage be a linear alternating triangular function. In all other cases, the output voltage will form an odd alternating function.

Whenever zero is passed, however, the summed output voltage will be linear with $\phi$. A rectangular voltage may again be produced by means of a Schmitt trigger circuit or a differential comparator with each passing of zero and a linear digital phase shifter for rectangular input and output voltages may be obtained with digital techniques and apparatus.

Figure 6:
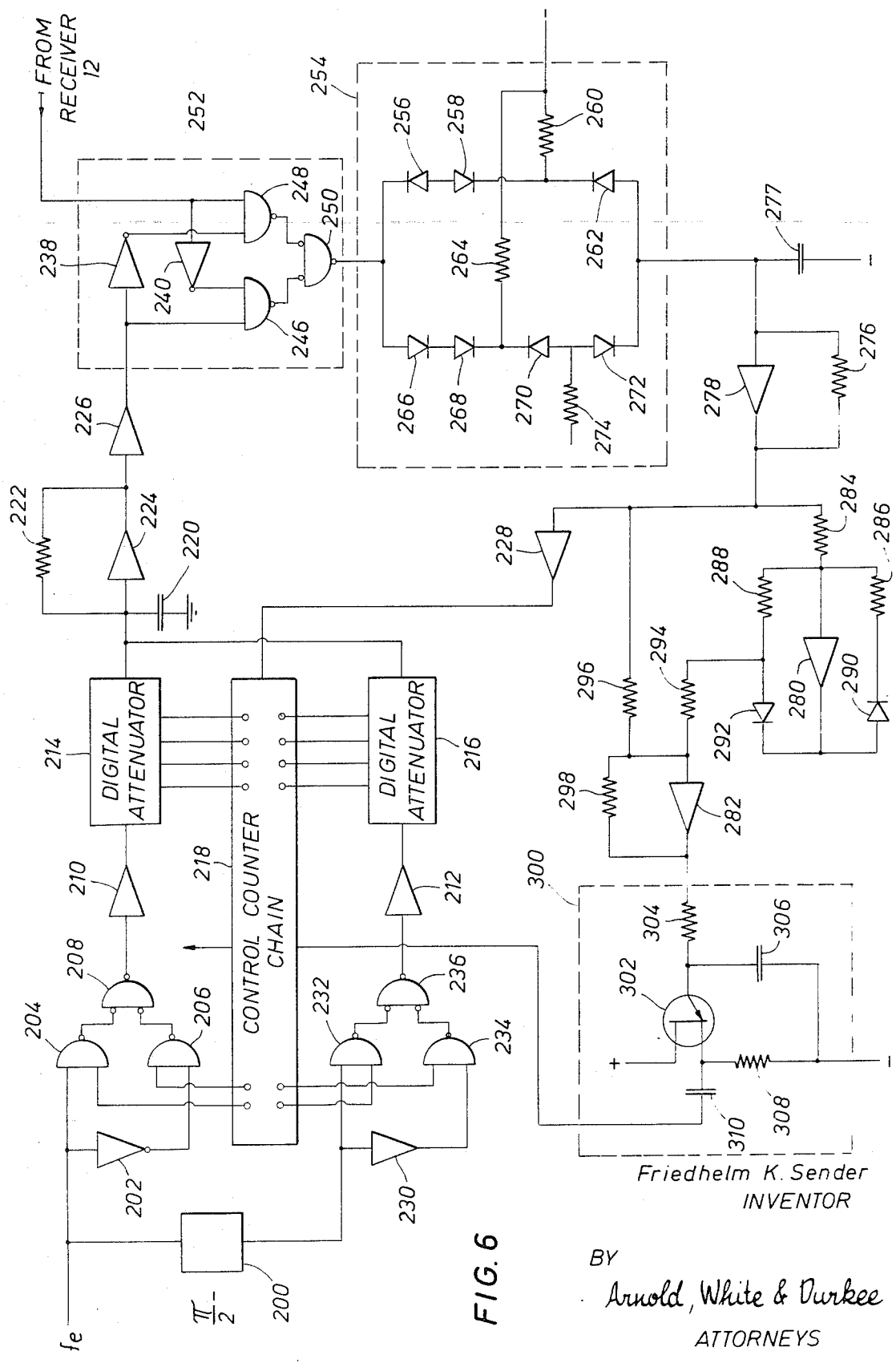
FIG. 6 is a functional block diagram representing a goniometer which is used in the receiver station of the apparatus suitable for the purpose of the present invention.

A complete digital goniometer system is illustrated in detail in FIG. 6. The figure illustrates components shown in FIG. 2 as goniometer 36, parallel adder 40, control register 38, phase comparator 44, and control logic circuit 46. The input on the lefthand side is the input from voltage controlled oscillator 34 of FIG. 2. The input on the right-hand side is the input received from receiver 12 of FIG. 2.

Because some of the input frequencies coming from oscillator 34 are partly negative in sign, this may be considered as a polarity reversal or shifting by $\pi$. Inverters 202 and 230 in conjunction with gate circuits are provided in the input line of the signal from oscillator 34 prior to connection to control counter chain 218. The control counter chain 218 corresponds in FIG. 2 to registers 38 and 48.

In particular, the input signal $f_e$ may be seen to be controlled by a suitable control counter chain 218 by way of digital attenuators 214 and 216. The signal $f_e$ is applied directly to an inverter 202 and to one input of AND gate 204, and after being passed through a suitable phase delay circuit 200, to another inverter 230 and to one input of another opposite AND gate 232. The outputs of inverters 202 and 230 are connected, respectively, to one of the inputs of AND gates 206 and 234. The inputs of AND gate 203, 206, 232 and 234 may be seen to be connected to appropriate portions of control counter chain 218.

The outputs of AND gates 204 and 206 are connected through a suitable OR gate 208 to the input of a suitable voltage limiting amplifier 210 having its output coupled to a digital attenuator 214. The outputs of AND gate 232 and 234 are connected through a different OR gate 236 to the input of another voltage limiting amplifier 212 having its output connected to another digital attenuator 216.

The parallel adder is a network already known in computer techniques. This network may be preferably executed in integrated circuit components and has for each bit two inputs "A" and "B," an output S with a binary transmission function, $A + B = S$.

The A input is connected to a control register, such as control register 38, and the B input is connected to a phase difference register, such as register 48. The sum output corresponds to the control counter chain 218 and is connected to components 204, 206 and 232, 234 and to digital attenuators 214 and 216.

Operationally in the system, the input frequency $f_e$ coming from oscillator 34 is fed directly through a so-called plus or minus switch comprising inverter 202 and, AND gate 204 and 206 and OR gate 208. The output from this plus or minus switch is applied through limiting amplifier 210 to digital attenuator 214. For simulating a second phase, the input frequency is shifted by $\pi/2$ by means of a delay network 200. The output from delay network 200 is similarly applied through a plus or minus switch, a limiting amplifier 212 and a digital attenuator 216.

The outputs of both attenuators 214 and 216 may be seen to be connected to the input of an integrating circuit composed of capacitor 220, amplifier 224 with a resistor 222 connected to provide an operational amplifier circuit having its output connected to a differential comparator 226. The output of differential comparator 226 may be seen to be connected to one input of a phase comparator 252, having its other input connected to the input from receiver 12, and composed of oppositely arranged inverter 238 and 240 coupled to AND gates 246 and 248. The output stage of phase comparator 252 may be seen to be an OR gate 250 having its inputs coupled to the outputs of the two AND gates 246 and 248, and having its output connected to the input of a dynamic analog converter 254. The output frequencies of the two digital attenuators 214 and 216 are integrated by means of integration condensor 220 to produce an alternating triangle function. To obtain clear zero passages, the voltage from this capacitor is amplified in amplifier 224 and transformed into a square wave voltage from differential comparator 226. This voltage is compared in phase comparator 252 with the square wave frequency from receiver 12. At the output of the phase comparator there is again a square wave voltage with asymmetry dependent upon phase difference of the two applied voltages.

As may be further seen in FIG. 6, converter 254 includes a pair of diodes 266 and 268 arranged in series to receive and conduct input signals to resistor 264 and to a blocking diode 270. The input signals are also received by a Zener diode 256 interconnected with opposing diodes 258 and 262. The circuit further includes a load resistor 260 connected between the junction of diodes 258 and 262, and the negative supply voltage. Positive voltage is applied to one end of a resistor 274 having its other end connected to the junction of opposing diodes 270 and 272, and negative voltage is applied to the junction between resistors 260 and 264.

In dynamic analog converter 254, the applied square wave voltage is transformed into a phase difference dependent dc-voltage the zero voltage corresponding to a phase shift of 90°. Phase comparator 252 and dynamic analog converter 254 correspond to phase converter 44 shown in FIG. 2.

The output of the dynamic analog converter 254 may be seen to be connected to another integrating circuit composed of a grounded capacitor 277, and an amplifier 278 coupled in parallel with a resistor 276 to form an operational amplifier. The output of this integrating circuit is applied through another differential comparator amplifier 228 to the control counter chain 218, into a pulse generator 300 by way of a precision full-wave rectifier/amplifier circuit.

More particularly, the first rectifier/amplifier circuit may be seen to include an amplifier 280 having its input side connected through a resistor 284 to the output of the operational amplifier 278, and having its output coupled to the junction of two series-connected diodes 290 and 292. A resistor 288 is connected between the diode 292 and the input of the amplifier 280, and another resistor 286 may similarly be connected between diode 290 and the junction between the two resistors 284 and 288.

The second rectifier/amplifier circuit includes another amplifier 282 connected in parallel with a suitable resistor 298 to form an operational amplifier, and having it input further connected to the junction between resistors 294 and 296. First resistor 294 is coupled to the junction between diode 292 and resistor 288, and other resistor 296 is coupled between the input of amplifier 282 and the output of amplifier 278.

The voltage from converter 254 is amplified by means of amplifier 278, and is fed as on-back control information through the limiter or differential comparator-amplifier 228, which ascertains whether a positive or negative deviation exists to control counter chain 218. A second path from amplifier 278 is developed through amplifiers 280 and 282 operating as precision full-wave rectifiers to pulse generator 300. At the output of amplifier 282 there is a positive voltage independently whether there is a positive or negative output voltage at phase comparator 252.

The pulse generator 300, which is coupled between control counter chain 218 and operational amplifier 282, may be seen to include a double base transistor 302 having its emitter connected through a resistor 304 to the output of operational amplifier 282, and having a base electrode coupled to positive voltage. The other base electrode of transistor 302 is coupled through a capacitor 310 to control counter chain 218, and also through a resistor 308 and capacitor 306 to the emitter. The junction of resistor 308 and capacitor 306 is coupled to negative voltage.

At the output of amplifier 282 there is a positive voltage, independently of whether there is a positive or negative output voltage at phase comparator 252. The positive voltage from amplifier 282 generates error pulses of a frequency which is dependent on the phase deviation voltage by means of the double base transistor 302. These pulses trigger control counter chain 218, until the output voltage of the phase comparator 252 becomes zero. This means that the phase relationship of the input frequencies of oscillator 34 and the receiver 12 is always maintained at 90°. The number of the control pulses for a 360° revolution is determined by the length of the control counter chain. For instance, 128 pulses can correspond to one revolution. A realization of essentially higher resolutions is possible, but the step width reached in the example is sufficient.

The network comprising amplifier 278, differential comparator 228, amplifier 280, amplifier 282, and pulse generator 300 correspond to the control logic depicted in FIG. 2 with reference to the output leading to register 48. The pulses delivered by double base transistor 302 and the on-back information coming from differential comparator 228 are applied to phase difference register 48, for operation as explained hereinabove.

For the mobile receiver station depicted in FIG. 3, the components belonging to goniometer 36' are in large part arranged in the same manner as shown in FIG. 6 for the goniometer system just explained. In the mobile receiver station there is a further parallel adder 54 between parallel adder 40' and goniometer 36' for adding the content of phase register 58 to the sum delivered by the S output of parallel adder 40'.

The goniometer 36' effectively receives the sum of register levels from control register 38', dPh register 48', and phase comparator 58. The phase comparator is comprised of networks 252 and 254, as is the case for the fixed receiver station. Control logic 56 of the mobile receiver station corresponds to the components associated with amplifier 278, differential comparator 228, amplifier 280, amplifier 282, pulse generator 300, double base transistors 302 all depicted in FIG. 6. The pulse output from pulse generator 300 and the foreback (directional) information from 228 is applied to phase register 58, which, in turn, closes the control circuit through parallel adder 54.

Counter chain 218 in the preferred embodiment of the present invention comprises several counter chains, which are connected through parallel adders. The output of digital attenuators 214 and 216 are interconnected through logic circuitry and are triggered by the sum of registers 38 and 48 at the fixed receiver station, or register 38', 48' and 58 at the mobile receiver station.

While particular embodiments of the invention have been shown, it will be understood that the invention is not limited thereto, since many modifications may be made and will become apparent to those skilled in the art.

What is claimed is:

1. A radio navigation system for determining the location of a station, comprising
   a first transmitter station fixedly disposed at a first location for generating a first preselected frequency;
   a second transmitter station fixedly disposed at a second location for generating a second preselected frequency;

a reference transceiver fixedly disposed at a third different location for receiving said first and second frequencies, and including a precision frequency standard, said transceiver developing first and second error correction signals with respect to the signals of said frequency standard; and a receiver located at the station for receiving said first and second frequencies and said error correction signals, and including a precision frequency standard operating at a known relation to said frequency standard of said reference transceiver, for determining the position of said receiver with respect to said first and second transmitter stations, said error correction signals correcting for operational deviations of said station receiver precision frequency standards from said first and second preselected frequencies.

2. The system described in claim 1, wherein said first and second frequencies occupy a single frequency channel.

3. The system described in claim 2, wherein said first and second frequencies are both sums of coherent frequencies.

4. The system described in claim 3, wherein said reference transceiver and station receiver precision frequency standards generate synchronized and equal output frequencies.

5. The system described in claim 4, wherein said reference transceiver and station receiver each include
a divider chain having a plurality of stages responsive to the output frequency of the frequency standard associated therewith and each delivering a fraction of said output frequency within a time period within which the other of said stages do not deliver any of said output frequencies, and
combining means responsive to said divider chain for combining delivered fractions of said associated frequency standard into a preselected frequency for phase comparison with said preselected frequencies from said first and second transmitter stations.

6. The receiver station described in claim 5, wherein said combining means further generates a fixed frequency difference relative to said selected one of said partial frequencies generated by said first and second transmitter stations.

7. The system described in claim 6, wherein the respective initial frequency of the preceding stage in each of said divider chains is divided by a factor of two in each of the subsequent stages therein.

8. The system described in claim 1, wherein said reference transceiver and station receiver precision frequency standards comprise atomic clocks.

9. The system described in claim 1, wherein said station is a mobile receiver station.

10. A radio navigation system as set forth in claim 1, wherein said reference transceiver includes
a synthesizer for internally generating a first reference signal at approximately said first preselected frequency and a second reference signal at approximately said second preselected frequency, and
comparison means for selecting and comparing said synthesized reference signals with said preselected frequencies for creating said error correction signals; and wherein said receiver station includes
a synthesizer synchronized with said transceiver for internally generating a first signal at approximately said first preselected frequences and a second signal at approximately said second preselected frequency, and
comparing means for selecting and comparing said signals synthesized in said station receiver with said preselected frequencies for determining position of said receiver,
said error correction signals correcting for deviation said station receiver synthesizer fails to approximate said first and second frequencies.

11. A radio navigation system for determining the location of a station, comprising
a first transmitter station fixedly disposed at a first location and generating a first identifiable signal of a preselected frequency,
a second transmitter station fixedly disposed at a second location for generating a second identifiable signal of a preselected frequency,
a reference transceiver fixedly disposed at a third different location for receiving said first and second identifiable signals and including a precision frequency standard, said transceiver developing first and second error correction signals of said preselected frequency with respect to the signal of said frequencies standard, and
a receiver located at the station for receiving said first and second identifiable signals and said error correction signals, and including a precision frequency standard operating at a known relation to said frequency standard in said reference transceiver, for determining the position of said receiver with respect to said first and second transmitter stations, said error correction signals correcting for operational deviation of said station receiver precision frequency standard with respect to said preselected frequency.

12. A radio navigation system for determining the location of a mobile station, comprising
a pair of transmitter stations at different fixed locations operating at respective carrier frequencies,
a transceiver at a third fixed location, including
a first precision frequency standard, and
means for developing a digital error signal between said frequency standard and said received carrier frequencies, and
a mobile receiver including
a second precision frequency standard synchronized with said first frequency standard, and
means for developing traveltime information from said received respective carrier frequencies and transmitting said traveltime information to said transmitter stations controlled by said second precision frequency standard,
said means utilizing said digital error signal for improving said traveltime information.

13. The system described in claim 12, wherein said first and second precision frequency standards are essentially identical.

14. A radio navigation system for determining the location of a mobile station, comprising
a pair of transmitter stations at different fixed locations operating at respective carrier frequencies,
a transceiver at a third fixed location, including a first precision frequency standard, and means for developing an error signal between said frequency standard and said received carrier frequency, and a mobile receiver including a second precision frequency standard synchronized with said first frequency standard, means for developing traveltime information from said received respective carrier frequencies and transmitting said traveltime information to said transmitter station controlled by said second precision frequency standard, a unilateral low band width communication channel for transmitting said error signal from said transceiver to said mobile receiver, said means utilizing said error signal for improving said traveltime information.

15. A radio navigation receiver for determining the location of a station from received first and second carrier waves transmitted from first and second fixedly located transmitters and a third fixedly located transmitter including an atomic clock synchronously operating with an atomic clock at the radio navigation receiver and developing error correction data of said atomic clock with respect to said first and second carrier waves, said receiver comprising derivative frequency and phase means for receiving the error correction data from said third transmitter and adjusting the frequency and phase of a signal related to the atomic clock frequency of said station receiver to equal nearly exactly the carrier waves from the first and second transmitters, and frequency and phase comparison means for developing the apparent difference in phase between the received carrier waves from said first and second transmitters and said corrected frequency signal related to the atomic clock frequency of said station receiver.

16. A method of navigation, comprising generating a first preselected frequency at a first fixed location, generating a second preselected frequency functionally related to and synchronous with said first frequency at a second fixed location, generating at a third fixed location error signals resulting from error signals received from said preselected frequencies received at said third fixed location and indicative of the difference between said first and second preselected frequencies and synthesized signal frequencies derived from an atomic clock, generating at a station location to be determined third and fourth frequencies derived from an atomic clock synchronously operating with the atomic clock at said third location, correcting said third and fourth frequencies in accordance with said error signals, detecting said first and second frequencies at said station location to be determined, simultaneously selecting one of said detected frequencies while suppressing the other of said detected frequencies, and comparing a function of said detected frequencies with said third and fourth frequencies.

17. The method described in claim 16, wherein said error signals are converted to digital signals and broadcast to said station receiver via a low band broadcast channel.

18. The method described in claim 17, including the step of determining the traveltime of said detected frequencies between said station location and the respective ones of said first and second locations as a function of a preselected common frequency.

19. The method described in claim 18, including the steps of transmitting a first frequency related signal from said first location as a function of said first preselected frequency and said common preselected frequency, transmitting a second frequency related signal from said second location as a function of said second preselected frequency and said common preselected frequency, detecting said frequency related signals at said station location, and simultaneously selecting one of said detected frequency related signals and suppressing the other of said detected frequency related signals.

20. The method described in claim 19, wherein said frequency related signals occupy the same broadcast band.

* * * * *